Figure 2:
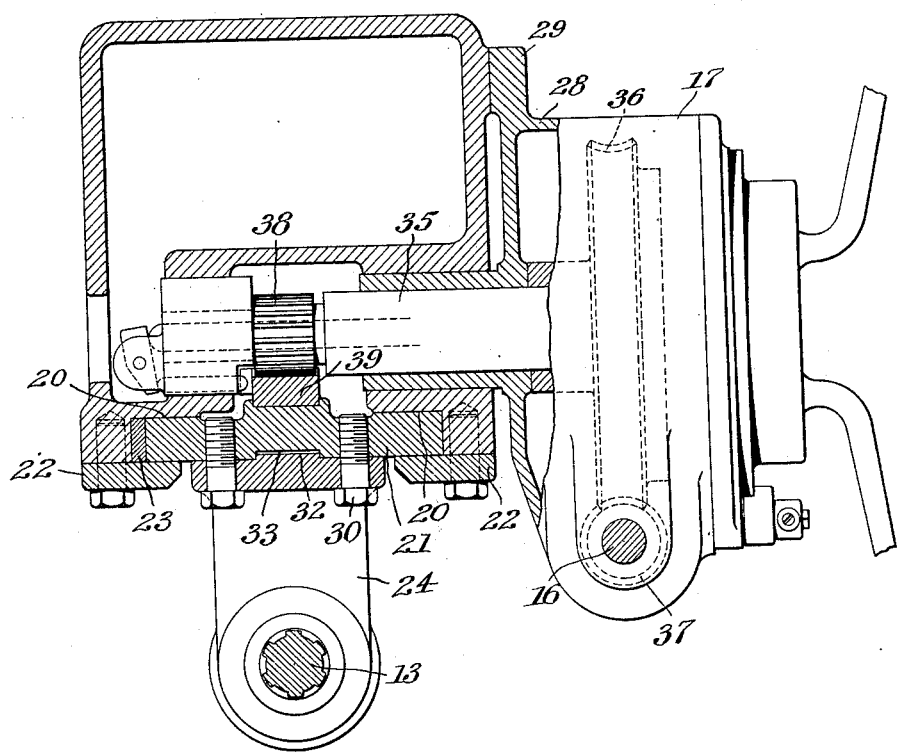

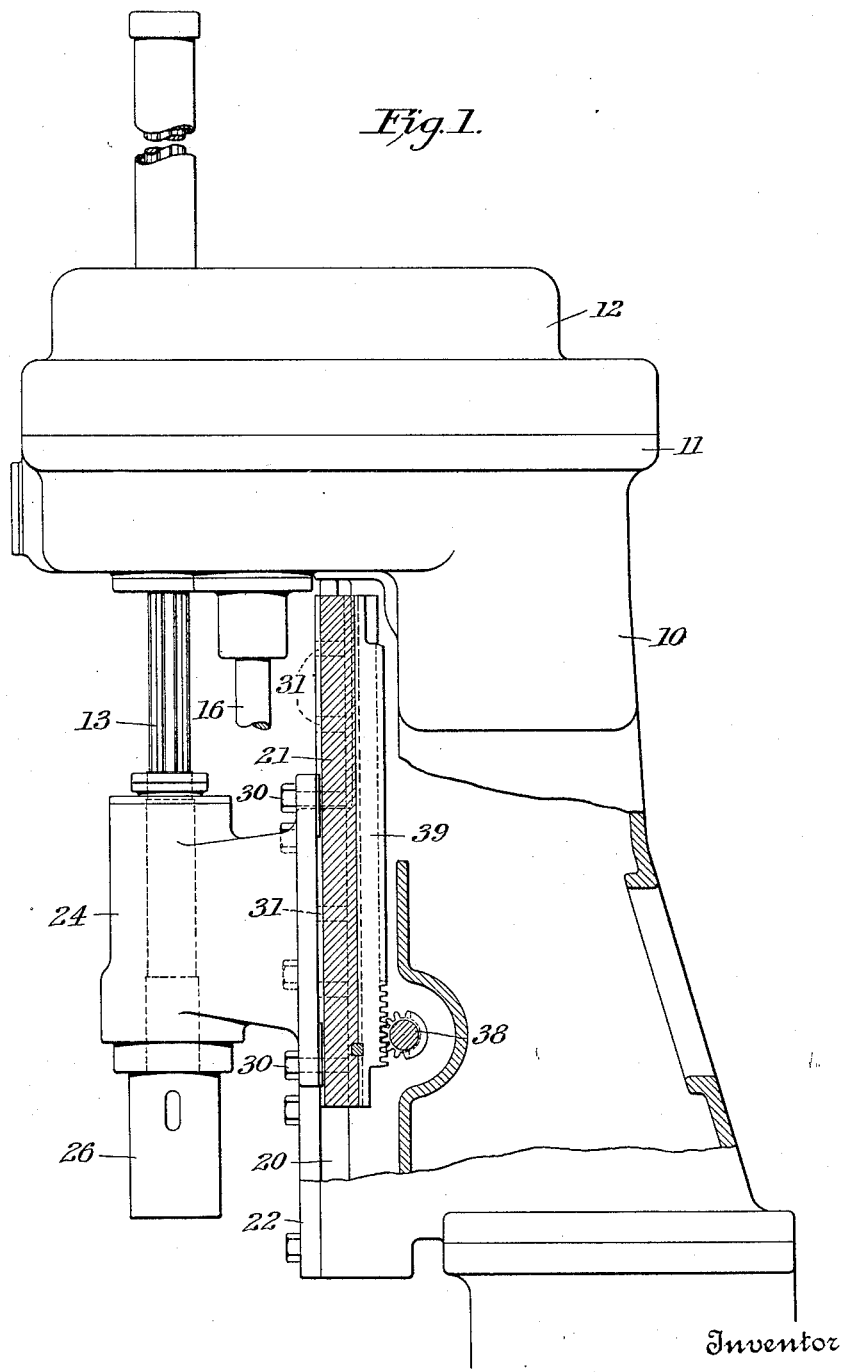

May 24, 1932. D. C. KLAUSMEYER 1,859,778
FEED SLIDE FOR INTERCHANGEABLE DRILL HEADS
Filed Sept. 4, 1929  3 Sheets-Sheet 2
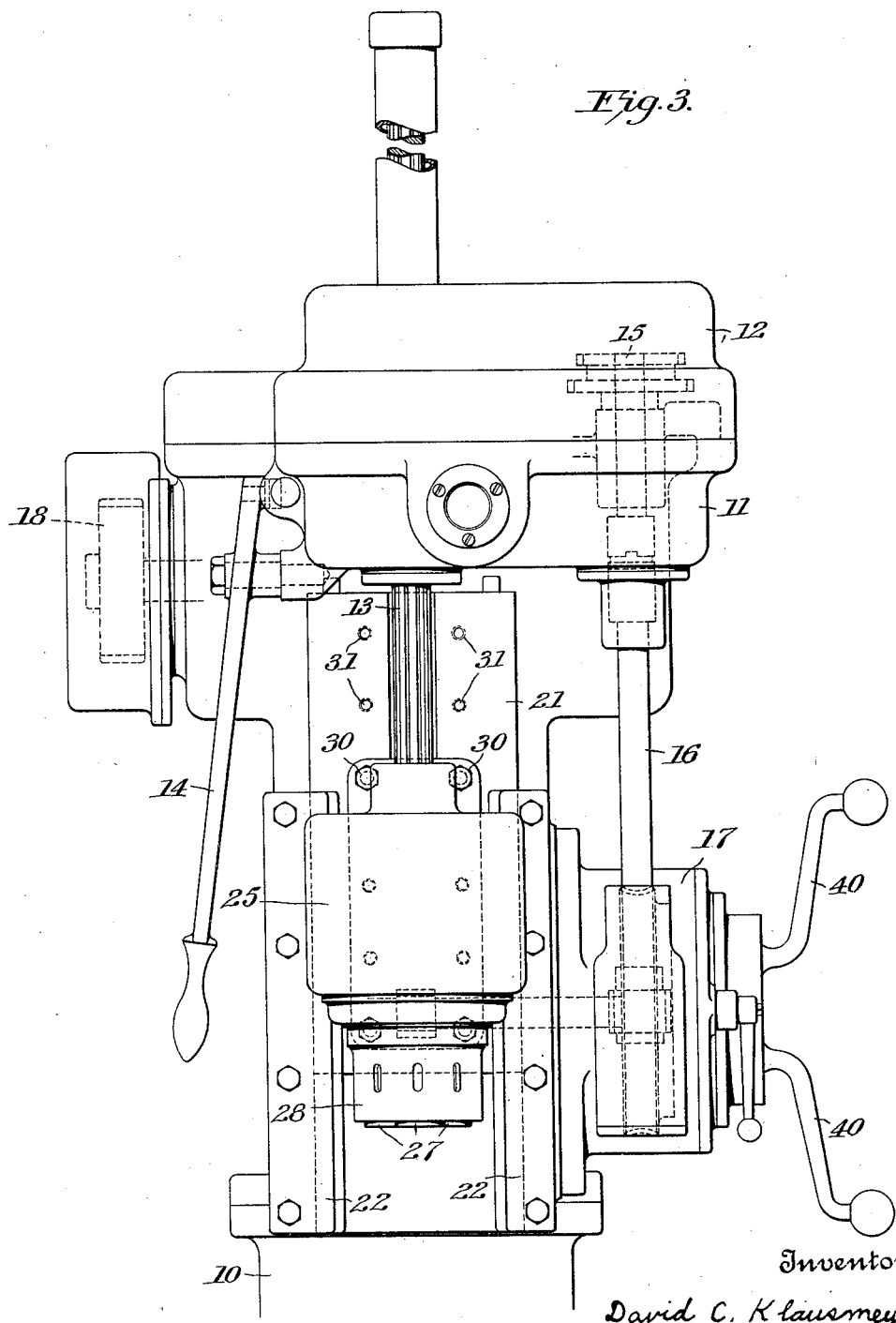
Inventor
David C. Klausmeyer
By Attorneys
Nathan & Bowman May 24, 1932.  D. C. KLAUSMEYER  1,859,778
FEED SLIDE FOR INTERCHANGEABLE DRILL HEADS
Filed Sept. 4, 1929  3 Sheets-Sheet 3

Inventor
David C. Klausmeyer
By Attorneys
Nathan & Bowman

Patented May 24, 1932

1,859,778

UNITED STATES PATENT OFFICE

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO

FEED SLIDE FOR INTERCHANGEABLE DRILL HEADS

Application filed September 4, 1929. Serial No. 390,252.

This invention is concerned with improvements in drilling machines, and particularly in its more specific aspects a machine of the type commonly known as an upright drilling machine having in its most common form and usage a single drill spindle. The new structural organization disclosed herein presents many advantages over prior devices which will be in part at least more specifically related hereinafter but for the present it may be stated in general that the arrangement results in greater rigidity of the drill spindle or spindles which rigidity is maintained irrespective of the type of spindle head employed in accordance with the interchangeability feature also incorporated; an economical and easy method of converting the machine into a single purpose machine of different types; availability of a large range of working zones; and control and operating mechanism permanently fixed as to position irrespective of the adjustment, making for greater speed and convenience of operation, and economy of manufacture.

A drilling machine of this type is required to be capable of usage under a great variety of conditions resulting primarily from the difference in size and shape of castings, the relative depth of opening to be machined, the accessibility afforded by the fixture employed to support the work, and the type of cutting tool employed.

To provide for such varying conditions drilling machines of the normal single spindle type have been provided with heads arranged on the drill column supporting the drill spindle therein intermediate the ends of the latter the head having mechanism mounted therein for translating the spindle. It may be seen that with such an arrangement that even where the head is made vertically adjustable on the frame to bring the spindle close to the work e. g., the spindle during the time when it is operating on the work will have been fed out of its bearings a considerable distance and the drill carrying spindle end will project furthest from its bearings at a time when it is most in need of support.

The present invention remedies this situation by providing a feed head or bracket translatable on the drill column the spindle being supported therein in ample bearings completely surrounded by the rigid frame work of the spindle head. The spindle being rotatable only in the slidable bracket can be provided with more rigid and closely fitting bearings including thrust bearings than if the spindle were also longitudinally movable through the bracket. A support for the drill spindle end is thus provided which is more rigid than that previously employed in this type or even in other types including a multiple spindle drilling machine. In this respect it may be here noted that although the machine described herein is fundamentally a single spindle type yet it may be provided, by a feature of interchangeability of heads to be referred to in more detail hereinafter, with a head having a plurality of spindles. Such means are broadly not new but in prior single spindle machines this modification has been accomplished by merely clamping or otherwise attaching the multiple head to the lower end of the single spindle or quill with the naturally resulting lack of lateral support. According to the present invention, however, the normal single spindle head may be quickly removed and a small multiple head substituted therefor, in which latter head the end of the main drive spindle and all of the tool carrying spindles are positively and rigidly supported.

The mechanism for translating the spindle supporting slide and the controls therefor are permanently mounted in the drill frame at a point where they can be most economically and compactly arranged. The controls are thus always in the same position to which the operator becomes accustomed and automatically reaches for, as opposed to the common type which are mounted on and translatable with the head. Such an arrangement also eliminates many flexible connections and machine parts. What amounts to perhaps an even greater advantage is that resulting from the fact that interchangeable drill spindle heads may be provided which are made demountable from the translatable feed slide and contain, therefore, but a minimum of mechanism commensurate with the change to be made in the different set-ups of the machine. All the actuating mechanism and controls, as above noted, are permanently mounted in the main frame. In prior devices this mechanism has been mounted in each head which were accordingly far more expensive and cumbersome in their individual construction.

Another object accomplished in the present invention is that of providing in the above organization, a means for adjusting the initial position of the spindle whereby it operates through a higher or lower zone in accordance with the specific type and kind of work to be performed. Such functions have been previously accomplished in various types of machines but the present arrangement cooperates with the remaining structure disclosed herein, and particularly in conjunction with the features of removability and interchangeability of the spindle heads, in a different manner and of especial advantage in the present organization. The arrangement disclosed affords a means for positively and rigidly securing the spindle in a definite predetermined position on the slide such position being in accordance with the requirements of the particular work in view.

More specific objects relate to the selection and relation of particular elements in a manner which results in a very compact, simple, and accurately operating organization as a whole.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 shows the upper end of a vertical single spindle drilling machine with parts of the column broken away to enable certain elements of this invention to be more easily seen; Fig. 2 is a horizontal section therethrough; and Fig. 3 shows a like machine but with a different spindle head thereon.

The specific machine employed for disclosing the features of this invention includes in Figs. 1 and 2 a column or frame 10 having at the upper end thereof a transmission head 11 including the removable cover casing 12 in which is mounted a somewhat common form of gear mechanism including a gear train for rotating the splined spindle shaft 13; a reversing clutch unit operable from the lever 14; and a gear train of which the double pick-off gear 15 forms a part for rotating the shaft 16 transmitting motion to the feed mechanism indicated generally at 17. Any suitable source of power may be provided such as a line shaft belt or individual motor connected to the wheel 18.

The forward face of the column is provided with vertical guide-ways 20 in which the spindle slide 21 is mounted and held closely in place by the straps 22 and adjustable gib 23. Secured to the slide is the spindle bracket or head 24 in Figs. 1 and 2 and 25 in Fig. 3.

Referring now more particularly to Figs. 1 and 2 the lower end of the splined spindle shaft 13 is formed with or has secured thereto as desired the tool carrying spindle 26. This tool spindle is rotatable but non-translatable with respect to the bracket 24. Any suitable bearings may be provided for the tool spindle within the bracket 24 it being evident that thrust and radial bearings may be employed in a manner to more accurately and closely embrace the spindle than if the spindle were longitudinally movable through the feed head as in the normal construction of single spindle upright drills.

In Fig. 3 there is shown a head or bracket 25 having therein a plurality of tool holding spindles 27 projecting slightly below the casing 28. Three of such spindles are shown in Fig. 3 but it will be readily apparent that heads may be provided having more or less and the design and purpose of the head varied in accordance with the specific requirements of a particular job. The removability of these heads with respect to the shafts 13 may be provided for in any desired manner such as by forming the shaft 13 with a joint to which the heads 24 or 25 may be connected through like complemental means. However the more convenient means and that illustrated is to provide each unit with its individual shaft 13 which may be easily withdrawn with the unit from the transmission gears in the head by reason of its splined connection therewith.

The important point to be noted is that these heads of Fig. 3 e. g. are interchangeable with the type shown in Fig. 1 and that the spindles in these multiple spindle heads are rigidly and completely supported against lateral displacement throughout their entire extent by reason of the fact that they are permanently mounted in a head which is secured to the slide 21. In common constructions previous hereto the multiple heads have been attached in some manner to the lower end of a spindle shaft such as 13. In such a construction it is obvious that the drills would project considerable distance from the supporting bearing with the attendant susceptibility to deflection and chatter.

In the arrangements of both Figs. 1 and 3 the spindles are provided with a solid bearing which is relatively close to the tool even in the farthest advanced position when the tool is most in need of lateral support. This results from the fact that the bearings are translatable with the spindles.

In order to compensate for variable operating conditions such as differently sized work pieces and tools of different lengths, means are provided for selectively positioning the brackets 24 or 25 on the slide 21. The range of movement thus remains constant in accordance with the translatory movement capable of being imparted to the slide 21 but the zone of movement would be varied in accordance with the position at which the bracket is mounted on the slide. This means consists of a set of bolt holes in the bracket 21 through which the screw bolts 30 project; and a plurality of sets of complemental threaded openings in the slide 21, the individual openings of which are indicated at 31. Accuracy and ease of alignment as well as rigidity in adjusted position of the bracket is assured by the rib 32 on the bracket engaging in the recess 33 of the slide.

The means just described co-operates with the feature of ready removability of the spindle brackets and serves to rigidly and positively secure the spindle brackets in a definite predetermined position in accordance with the requirements.

The mechanism for translating the slide 21 and thereby the drill spindles is mounted in the column including the casing 28 which may be made integral with the column or not as desired but preferably is made removable and secured thereon by means of bolts through the flange 29 whereby the feeding mechanism may be removed as a unit. For the purposes of a disclosure of the present invention only the general features of the feeding mechanism need be described. Such features include a shaft 35 mounted for rotation in suitable bearings and receiving its rotation through the worm wheel 36 fixed thereon and meshing with the worm 37 on the shaft 16. The opposite end of feed shaft 35 carries a pinion 38 meshing with a rack 39 centrally mounted on the slide 21. Hand levers 40 are also provided operative on the shaft 35. The slide may, therefore, be fed either manually or by power means and the latter automatically controlled all in a manner well known and the specific details of which are not of importance in connection with the present invention.

The above described feeding mechanism it will be observed is mounted in a fixed non-translatable position on the frame which results in various important advantages. By having it thus located in relation to the general organization instead of in the spindle head e. g. the latter can be much more economically manufactured and the purchaser is thereby enabled to convert the machine into a large variety of set-ups at a relatively low cost. Further such changes may be accomplished with a minimum of connections. As a further advantage the feeding mechanism can be originally located at a point most convenient to the operator and where the greatest compactness of general design will result. The controls being non-translatable will always be located where the operator becomes accustomed to reach for them.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:—

1. An upright drilling machine combining a frame; a spindle mounted therein; means for rotating said spindle, the spindle being translatable with respect to said rotating means; spaced substantially L-shaped vertically extending guide surfaces on the forward face of said frame; straps secured to said frame and cooperating with said guide surfaces to provide guideways; a spindle slide plate translatably mounted in said guideways; a spindle bracket, having a bearing providing a support for said spindle, supported by and translatable with said slide plate; means for bolting said bracket to said slide plate in any one of a plurality of predetermined vertically spaced positions; and means for translating said slide plate to feed said spindle.

2. An upright drilling machine according to claim 1 characterized by this, that the means for translating the slide plate comprises a rack-bar fixed to said slide plate and a pinion rotatably journaled in the machine frame and engaging said rack-bar, and means for rotating said pinion.

3. An upright drilling machine according to claim 1, characterized by this, that the means for bolting the spindle bracket to the slide plate comprises a series of bolt holes in said spindle bracket; a plurality of series of vertically spaced threaded apertures in said slide plate, each series being complemental to the bolt holes in said spindle bracket; and bolts adapted to be passed through the holes in said bracket and threaded into any one of the series of threaded apertures in said slide plate.

4. An upright drilling machine as set forth in claim 1 in which the spindle bracket is positioned horizontally on said slide plate by having a portion of one of said elements fitted to a vertical groove in the adjacent face of the other element, and the two are secured together in predetermined vertical position by bolts passed through holes formed in said bracket and threaded into vertically spaced series of threaded apertures in said slide plate.

In witness whereof, I have hereunto subscribed my name.

DAVID C. KLAUSMEYER.